United States Patent
Reents et al.

(10) Patent No.: US 10,437,740 B2
(45) Date of Patent: Oct. 8, 2019

(54) HIGH PERFORMANCE RAID OPERATIONS OFFLOAD WITH MINIMIZED LOCAL BUFFERING

(71) Applicant: EXTEN Technologies, Inc., Austin, TX (US)

(72) Inventors: Daniel B. Reents, Dripping Springs, TX (US); Ashwin Kamath, Cedar Park, TX (US); Michael Enz, Fargo, ND (US)

(73) Assignee: Exten Technologies, Inc., Austin, TX (US)

( * ) Notice: Subject to any disclaimer, the term of this patent is extended or adjusted under 35 U.S.C. 154(b) by 0 days.

(21) Appl. No.: 15/844,501

(22) Filed: Dec. 15, 2017

(65) Prior Publication Data

US 2019/0188152 A1    Jun. 20, 2019

(51) Int. Cl.
*G06F 12/1081* (2016.01)
*G06F 11/10* (2006.01)
*G06F 13/28* (2006.01)

(52) U.S. Cl.
CPC ...... *G06F 12/1081* (2013.01); *G06F 11/1004* (2013.01); *G06F 11/1076* (2013.01); *G06F 13/28* (2013.01); *G06F 2211/105* (2013.01)

(58) Field of Classification Search
CPC ............ G06F 12/1081; G06F 11/1004; G06F 11/1076; G06F 13/28; G06F 2211/105
See application file for complete search history.

(56) References Cited

U.S. PATENT DOCUMENTS

| | | | | |
|---|---|---|---|---|
| 5,630,154 A | * | 5/1997 | Bolstad | G06F 15/8046 342/159 |
| 5,991,861 A | * | 11/1999 | Young | G06F 13/385 710/315 |
| 9,858,200 B1 | * | 1/2018 | Griffin | G06F 12/10 |
| 2006/0294416 A1 | * | 12/2006 | Tsai | G06F 11/1076 714/6.2 |
| 2007/0071101 A1 | * | 3/2007 | Topham | G06F 9/30003 375/240.16 |
| 2010/0257335 A1 | * | 10/2010 | Hanai | G06F 15/7867 712/15 |

* cited by examiner

*Primary Examiner* — Glenn A. Auve
(74) *Attorney, Agent, or Firm* — Sprinkle IP Law Group

(57) ABSTRACT

The present technique presents a hardware mechanism by which high performance computational engines utilize external/system memory buffers for data source and sync thus requiring a minimized amount of local buffering and imposing almost no buffer or data size limitations.

18 Claims, 1 Drawing Sheet

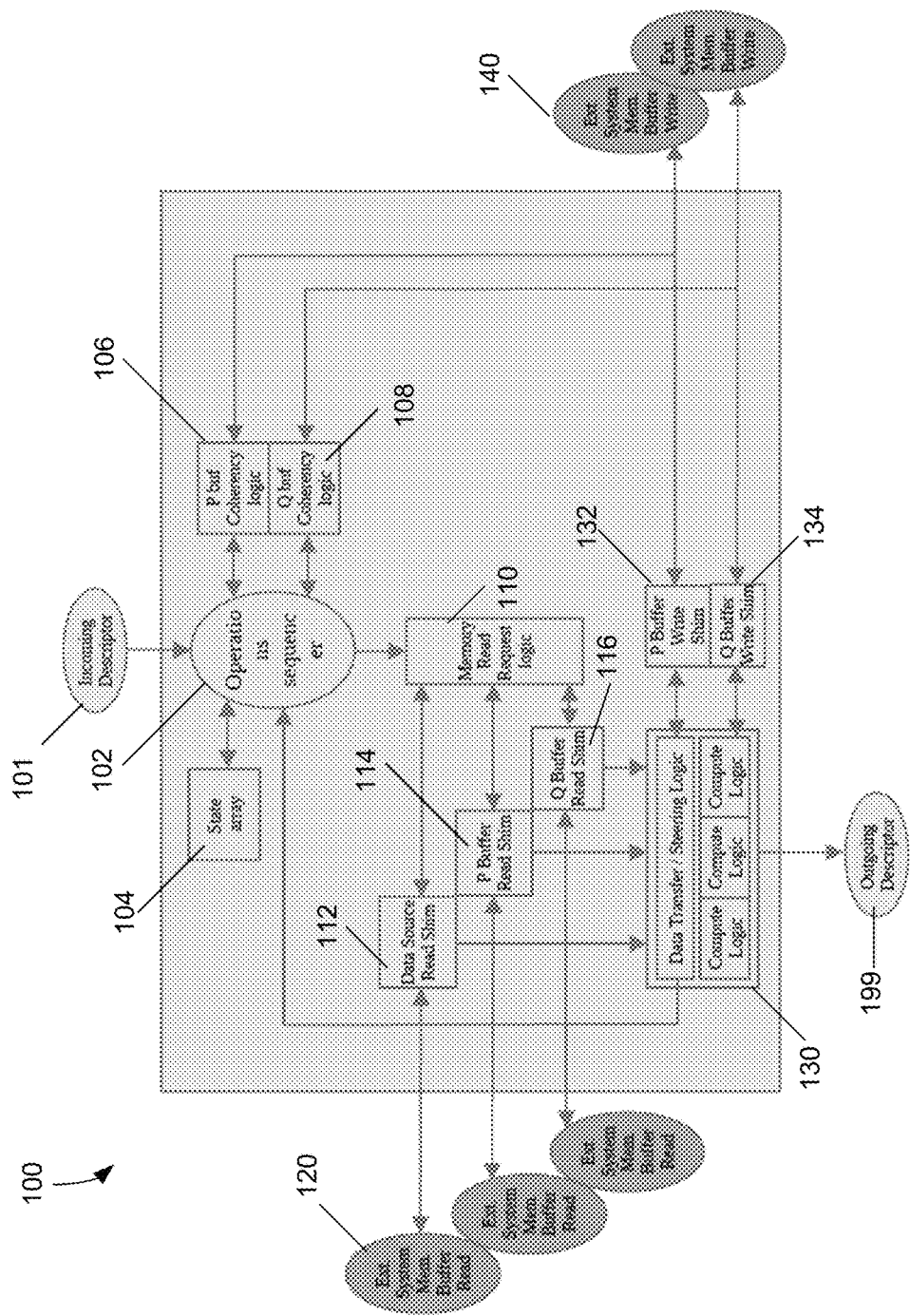

HIGH PERFORMANCE RAID OPERATIONS OFFLOAD WITH MINIMIZED LOCAL BUFFERING

TECHNICAL FIELD

The subject disclosure relates generally to computer hardware and software design. In particular, the subject disclosure relates to improving performance of redundant array of independent disks (RAID).

BACKGROUND

In a typical computing system, the compute node will contain fairly large quantities of local buffering. This buffering is required to hold the partial results of the iterative computations performed by the compute hardware. When computations are complete or partial computations are required to be flushed from the compute machine, the results are transferred out to other system memory resources. This local buffering requirement serves to lower the computational efficiency of the compute node and slow down the operation, and limits the data size of the operation to the available local buffer space.

SUMMARY OF THE SUBJECT DISCLOSURE

The present subject disclosure presents a hardware mechanism by which high performance computational engines (erasure codes, XOR operations, CRC generation and checking, etc.) utilize external/system memory buffers for data source and sync thus requiring a minimized amount of local buffering and imposing almost no buffer or data size limitations.

In one exemplary embodiment, the present subject matter is a method for performing an operation on a compute node in a systolic array. The method includes receiving an incoming descriptor which includes a requested operation; and carrying out the requested operation using a buffer external to the compute node.

In another exemplary embodiment, the present subject matter is a method for performing an operation on a compute node in a systolic array. The method includes receiving an incoming descriptor which includes a requested operation, wherein the descriptor contains all of the information that is required by the compute node to fully execute the requested operation; and carrying out the requested operation using external system memory buffer read and external system memory buffer write.

In yet another exemplary embodiment, the present subject matter is a system for performing an operation on a compute node in a systolic array. The system includes an operation sequencer to receive an incoming descriptor which includes a requested operation; a computation logic to perform the requested operation; and an external buffer in communication with the computation logic connected through a shim.

BRIEF DESCRIPTION OF THE DRAWINGS

Various exemplary embodiments of this disclosure will be described in detail, wherein like reference numerals refer to identical or similar components or steps, with reference to the following FIGURES, wherein:

FIG. 1 illustrates a computational flow using external system memory buffers, according to an exemplary embodiment of the present subject disclosure.

DETAILED DESCRIPTION

According to the present subject disclosure, by utilizing the very large system memory resources for compute result buffering, the present technique provides a number of benefits, including: a very low chance that compute buffers will be exhausted; almost unlimited data set size supported (i.e., buffer size/RAID stripe size); eliminates the need for system firmware to shuffle partially complete data buffers to deal with buffer exhaustion; reduces data movement latency (i.e., eliminates all store and forward data movement); significantly reduces the compute node's hardware foot print as it requires almost no local memory.

There are many novel aspects of the mechanism discussed according to the present subject disclosure. Some non-limiting examples include, but are not limited to: very low hardware footprint and low local memory requirements; extremely large number of active buffers supported; almost any buffer size supported; no extra firmware control required to manage buffer exhaustion; very high performance via extremely efficient data movement; can be used as a generic mechanism to copy large amounts of data from system buffer to system buffer; single bit of state for each parallel computation for safely sequencing an arbitrarily ordered pipeline of requests to the same destination buffer. Other advantages are also evident to one having ordinary skill in the art after having considered the present disclosure.

An exemplary embodiment of the system 100 is shown in FIG. 1. The FIGURE depicts the overall flow of the subject matter and its interconnection to the rest of the system. In particular, the interfaces to the external system memory 120, 140 are shown. To start the flow, the system enqueues a data structure (or descriptor) referred to herein as the XORH (XOR Header). The incoming descriptor 101 includes a header which contains all of the information that is required by the machine to fully execute the requested operation. These items include: an opcode defining the specific operation that is desired; state array index value; data source buffer address; P buffer address (contains the XOR results in this particular implementation); Q buffer address (contains the multiplication result in this particular implementation); byte length of the transaction; and CRC enable flag (used to append CRC to calculated buffer data).

Once the incoming descriptor 101 is recognized, the operation sequencer 102 queries the state array 104 at the beginning of most operations. Typically, the first thing that the operations sequencer 102 will do is read the data, and then steer it to the computational logic 130. As the computations are completed by the computation logic 130, the results are typically written back to some buffer in the external memory 120, 140. A P buffer write shim 132 and a Q buffer write shim 134 communicate between the computational logic 130 and the external system memory buffer write 140. As the computation is done, an outgoing descriptor 199 is created and sent out to another node, or to the originating node that sent the incoming descriptor 101, to tell it that the operation is complete. This process minimizes the local buffering requirement.

Further, a data source shim 112 connects to an external source of data. Also, a P buffer read shim 114 and a Q buffer read shim 116 link to external system memory buffers. A memory read request logic 110 receives information from the operations sequencer 102 and interacts with all three shims 112, 114, 116. The P buffer is the parity buffer and holds the XOR results, and the Q buffer is the multiplication buffer, and holds multiplication results that are being performed on the data source buffer.

The state array 104 is a mechanism by which the hardware can determine whether the operation is initializing the P buffer and the Q buffer, or generating a computation, before it writes the P buffer and the Q buffer. The hardware maintains an array of bits that represent the state of each transaction that shares an output buffer. Each transaction may involve multiple computations with separate descriptors that read-modify-write the output buffers. The incoming XORH descriptor provides a "state_index" identifying the transaction, and one bit in the state array reflects the transaction state. This allows an arbitrary order of transactions to arrive at the computation engine, ensuring that initialization happens only one time for the transaction. Thus, the state array bit value 104 determines whether an initialization is going to occur, or a computation.

The P buffer coherency logic 106 and Q buffer coherency logic 108 ensure that there is no inadvertent overwrite of a buffer location thereby creating a "collision." These components assure that there is no stepping on oneself during the pipeline flow when multiple descriptors arrive at the same time.

During the state of initialization, the data source buffer 112 is read and the data is entered into the P buffer 114 and the Q buffer 116. The next step is to read the data source buffer 112 and read the P buffer 114, and XOR the two values together, and write the result back out to the P buffer 114. The same happens for the Q buffer 116, but the two results would be multiplied together, and the result would be written out to the Q buffer 116. The latter steps constitute a computation, as opposed to an initialization. These computations may be repeated multiple times depending on the RAID configuration, as needed to come up with a complete result for the P buffer, and a complete result for the Q buffer for that particular data stripe.

The specific state array 104 bit to be queried is provided in the "state_index" field of the XORH being processed. For operations that will write the P and the Q buffers, the state bit indicates to the hardware if the buffers are to be initialized or are to be read/modified/written with the actual P and Q computational results. If initialization is occurring, the hardware automatically changes the bit state at the end of the operation else it will not. A specific opcode type (CLEAR STATE) is used to change the bit back to its initialization value.

The operations logic is primarily responsible for managing all data movement between the data source 112, P 114, and Q buffers 116 (reads and writes). These buffers physically reside in the external system memory (i.e., in the bulk system memory). The shims are provided in the FIGURE. Depending on the opcode type, data read from the external buffers is steered through the CRC generator and/or the XOR and Multiplier hardware prior to being written back to the appropriate external buffer.

Note that the read and write "shim" modules shown in the diagram are very simple interface control modules that contain a very shallow first in first out for temporary data storage. These modules can be easily modified to adapt to most any system memory interface protocol and, in the specific implementation, also include the credit management logic for the interface.

Data transfer may occur in any size, regardless of the full computation size. For example, the data read may pipeline with the computation and data write in chunks of 256 bytes when computing a 4096 byte computation. This requires 16 reads, 16 computes, and 16 writes of 256 bytes each. By pipelining the computation, the local memory buffering requirement is reduced.

In order to prevent data corruption, two coherency checking modules are present. The operations logic will compare the "state_index" value present in the incoming XORH with all entries in the appropriate coherency buffer. If a match is detected, the operation will stall. When the match is not present, the operation will proceed and if the operation will result in a buffer write back, the state_index value in the incoming XORH will be written into the appropriate coherency buffer. When the buffer write back has been fully committed to the on chip buffer SRAM, the appropriate coherency buffer will be popped thus removing that entry. The "state_index" value acts as a transaction tag and is relevant to any opcode that causes a write back to the P or Q buffer write back interfaces. These include: Write P; Write Q; Write PQ; Generate CRC (write back is via the P buffer write back interface). This behavior ensures that an asynchronous write to the output buffer completes prior to the next read of that buffer for the next descriptor in the transaction.

As each operation is completed, the various results are gathered and a final response descriptor is generated and sent to the outbound interface. The table below summarizes the actions of the operation logic for each opcode that is supported. The operation may include reading the source buffer, reading the P buffer, reading the Q buffer, writing the P buffer, or writing the Q buffer. The table presents the different operations the machine can do depending on the opcode.

For example, when the opcode is the clear state, then all of the buffers are initialized, and none of the buffers operate in read or write.

In the example of the "Write P" opcode with a state bit=0, the source code buffer is read, the P read buffer is not read, the Q read buffer is not read, the P write buffer is in write, and the Q write buffer is not in write. In this case, the P buffer write data is the same as the source buffer read data. In other words, P buffer is initialized, because the state bit=0.

The next example of "Write P" shows a state bit=1, which indicates a computation. Here, the source code is read, P buffer is read, and the P buffer is in write. In other words, the P buffer write data equals the P buffer read data XOR the source buffer read data. An actual computation then occurs.

| Op Code | state bit | Src Buf Rd | P Buf Rd | Q Buf Rd | P Buf Wr | Q Buf Wr | Notes |
|---|---|---|---|---|---|---|---|
| Clear State | X | no | no | no | no | no | Changes state bit to its "initialization" state |
| Write P | 0 | yes | no | no | yes | no | P Buf Wr data = Src Buf Rd data |
| Write P | 1 | yes | yes | no | yes | no | P Buf Wr data = P Buf Rd data ^ Src Buf Rd data |
| Write Q | 0 | yes | no | no | no | yes | Q Buf Wr data = Src Buf Rd data * Beta |
| Write Q | 1 | yes | no | yes | no | yes | Q Buf Wr data = Q Buf Rd data ^ (Src Buf Rd data * Beta) |
| Write PQ | 0 | yes | yes | yes | yes | yes | |

| Op Code | state bit | Src Buf Rd | P Buf Rd | Q Buf Rd | P Buf Wr | Q Buf Wr | Notes |
|---|---|---|---|---|---|---|---|
| Write PQ | 1 | yes | yes | yes | yes | yes | |
| Zero Detect | X | yes | yes | no | no | no | Results are returned in the prelude.pstatus field |
| CRC Generate | X | yes | yes | no | no | no | The physical P Buf Wr interface is used to write back the 4 Bytes CRC value to the end of the Src Buffer location |
| CRC Validate | X | yes | no | no | no | no | Results are returned in the prelude.pstatus field |

As mentioned above, the XORH contains a bit called crc_enable. If this bit is set for the Write P, Write Q, or Write PQ opcodes the hardware will write back the 4 byte CRC value that was computed over the contents that was read from the data source buffer. Just like the CRC generate opcode, the physical P Buf Wr interface is used for the CRC value write back. Also, all P and Q calculations will include the computed CRC value as part of the source buffer data stream.

The subject matter described herein may be used in a variety of preferred ways, including, for example: (a) generation of a module level description of the mechanism; (b) low level, micro-architecture document showing block level flow diagrams for the implementation; (c) generation of Verilog RTL to implement the design; (d) block level simulation to verify the design and modify any issues found; (e) bring up and testing utilizing a hardware emulation platform; (f) integration into the top level design; (g) system level simulation; (h) standard back-end ASIC development process to produce the targeted device. Other variations are also possible.

Alternate uses of the subject disclosure are also within the scope of the present disclosure. For example, the present subject disclosure may be used as a generic, high performance mechanism to copy large amounts of data from system buffer to system buffer. This can be thought of as a type of hardware DMA (Direct Memory Access) mechanism. Additional compute logic can be easily added to the mechanism in the future. The current implementation supports these operations: initialization (with or without CRC generation); calculate XOR (with or without CRC generation); calculate erasure code, i.e., multiplier result (with or without CRC generation); calculate both XOR and erasure code (with or without CRC generation); calculate CRC; validate CRC; zero detect (XOR with compare result)

The examples and methods described above are not limited to software or hardware, but may be either or a combination of both. If software, the method described is presented as code in a software program. If hardware, a processor is used to conduct the steps which are embedded within the hardware. The subject matter may also be a combination of software and hardware with one or more steps being embedded within a hardware component, and the other steps being part of a software program.

The illustrations and examples provided herein are for explanatory purposes and are not intended to limit the scope of the appended claims. It will be recognized by those skilled in the art that changes or modifications may be made to the above described embodiment without departing from the broad inventive concepts of the subject disclosure. It is understood therefore that the subject disclosure is not limited to the particular embodiment which is described, but is intended to cover all modifications and changes within the scope and spirit of the subject disclosure.

What is claimed is:

1. A system for performing an operation on a computer node, comprising:
an operation sequencer to receive an incoming descriptor which includes an opcode for requested operation associated with an XOR operation, and a data source in a system memory of a computer node;
a P buffer shim for reading or writing to a P buffer in the system memory of the computer node;
a Q buffer shim for reading or writing to a Q buffer in the system memory of the computer node; and
computation logic to perform the requested operation associated with the XOR operation by:
reading data from the data source in the system memory of the computer node;
writing data from the data source to the P buffer in the system memory using the P buffer shim;
writing data from the data source to the Q buffer in the system memory using the Q buffer shim;
reading a first value from the P buffer in the system memory using the P buffer shim;
XORing the first value obtained from the P buffer in the system memory with a second value from the data source in system memory to obtain a first result;
writing the first result to the P buffer in the system memory using the P buffer shim;
reading a second value from the Q buffer in the system memory using the Q buffer shim;
multiplying the first result with the second value obtained from the Q buffer in the system memory to obtain a second result; and
writing the second result out to the Q buffer using the Q buffer shim.

2. The system of claim 1, wherein the P buffer shim includes a P buffer write shim and a P buffer read shim.

3. The system of claim 2, wherein the Q buffer shim includes a Q buffer write shim and a Q buffer read shim.

4. The system of claim 1, wherein computation logic creates an outgoing descriptor indicating the requested operation is complete.

5. The system of claim 4, wherein the outgoing descriptor is sent to an originating node of the incoming descriptor.

6. The system of claim 1, wherein the system further comprises a coherency buffer including a set of entries and the incoming descriptor includes a state index value and wherein when the state index value matches an entry in the set of entries of the coherency buffer the requested operation is stalled.

7. A method for performing an operation on a computer node, comprising:
receiving an incoming descriptor which includes an opcode for requested operation associated with an XOR operation, and a data source in a system memory of a computer node;

providing a P buffer shim for reading or writing to a P buffer in the system memory of the computer node;
providing a Q buffer shim for reading or writing to a Q buffer in the system memory of the computer node; and
performing the requested operation associated with the XOR operation by:
  reading data from the data source in the system memory of the computer node;
  writing data from the data source to the P buffer in the system memory using the P buffer shim;
  writing data from the data source to the Q buffer in the system memory using the Q buffer shim;
  reading a first value from the P buffer in the system memory using the P buffer shim;
  XORing the first value obtained from the P buffer in the system memory with a second value from the data source in system memory to obtain a first result;
  writing the first result to the P buffer in the system memory using the P buffer shim;
  reading a second value from the Q buffer in the system memory using the Q buffer shim;
  multiplying the first result with the second value obtained from the Q buffer in the system memory to obtain a second result; and
  writing the second result out to the Q buffer using the Q buffer shim.

8. The method of claim 7, wherein the P buffer shim includes a P buffer write shim and a P buffer read shim.

9. The method of claim 8, wherein the Q buffer shim includes a Q buffer write shim and a Q buffer read shim.

10. The method of claim 7, further comprising creating an outgoing descriptor indicating the requested operation is complete.

11. The method of claim 10, wherein the outgoing descriptor is sent to an originating node of the incoming descriptor.

12. The method of claim 7, further comprising providing a coherency buffer including a set of entries, wherein the incoming descriptor includes a state index value and when the state index value matches an entry in the set of entries of the coherency buffer the requested operation is stalled.

13. A non-transitory computer readable medium comprising instructions for:
  receiving an incoming descriptor which includes an opcode for requested operation associated with an XOR operation, and a data source in a system memory of a computer node;
  providing a P buffer shim for reading or writing to a P buffer in the system memory of the computer node;
  providing a Q buffer shim for reading or writing to a Q buffer in the system memory of the computer node; and
  performing the requested operation associated with the XOR operation by;
    reading data from the data source in the system memory of the computer node;
    writing data from the data source to the P buffer in the system memory using the P buffer shim;
    writing data from the data source to the Q buffer in the system memory using the Q buffer shim;
    reading a first value from the P buffer in the system memory using the P buffer shim;
    XORing the first value obtained from the P buffer in the system memory with a second value from the data source in system memory to obtain a first result;
    writing the first result to the P buffer in the system memory using the P buffer shim;
    reading a second value from the Q buffer in the system memory using the Q buffer shim;
    multiplying the first result with the second value obtained from the Q buffer in the system memory to obtain a second result; and
    writing the second result out to the Q buffer using the Q buffer shim.

14. The non-transitory computer readable medium of claim 13, wherein the P buffer shim includes a P buffer write shim and a P buffer read shim.

15. The non-transitory computer readable medium of claim 14, wherein the Q buffer shim includes a Q buffer write shim and a Q buffer read shim.

16. The non-transitory computer readable medium of claim 13, further comprising creating an outgoing descriptor indicating the requested operation is complete.

17. The non-transitory computer readable medium of claim 16, wherein the outgoing descriptor is sent to an originating node of the incoming descriptor.

18. The non-transitory computer readable medium of claim 13, further comprising providing a coherency buffer including a set of entries, wherein the incoming descriptor includes a state index value and when the state index value matches an entry in the set of entries of the coherency buffer the requested operation is stalled.

* * * * *